(12) United States Patent
Frohwein et al.

(10) Patent No.: US 7,159,607 B2
(45) Date of Patent: *Jan. 9, 2007

(54) LOW PERMEATION WELDABLE FUEL TANK ASSEMBLY

(75) Inventors: Axel Frohwein, Neufahrn (DE); William H. Goodman, Jr., Fountain Inn, SC (US)

(73) Assignee: Alfmeier Corporation, Greenville, SC (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/138,569

(22) Filed: May 26, 2005

(65) Prior Publication Data

US 2005/0211297 A1    Sep. 29, 2005

Related U.S. Application Data

(63) Continuation-in-part of application No. 10/356,380, filed on Jan. 31, 2003, now Pat. No. 6,915,812.

(51) Int. Cl.
*F16K 24/04* (2006.01)

(52) U.S. Cl. .................... 137/202; 137/587
(58) Field of Classification Search ............. 137/202, 137/587

See application file for complete search history.

(56) References Cited

U.S. PATENT DOCUMENTS

| | | | |
|---|---|---|---|
| 4,212,488 A | 7/1980 | Cook | |
| 4,214,767 A | 7/1980 | Davies, III | |
| 4,569,637 A | 2/1986 | Tuckey | |
| 4,905,726 A | 3/1990 | Kasugai et al. | |
| 5,139,043 A | 8/1992 | Hyde et al. | |
| 5,148,792 A | 9/1992 | Tuckey | |
| 5,402,818 A | 4/1995 | Kasugai et al. | |
| 5,404,907 A | 4/1995 | Benjey et al. | |
| 5,441,781 A | 8/1995 | Uchida et al. | |
| 5,443,874 A | 8/1995 | Tachi et al. | |
| 5,449,018 A | 9/1995 | Harris | |
| 5,449,029 A | 9/1995 | Harris | |
| 5,518,018 A | 5/1996 | Roetker | |
| 5,529,086 A | 6/1996 | Kasugai et al. | |
| 5,535,772 A | 7/1996 | Roetker et al. | |
| 5,566,705 A | 10/1996 | Harris | |
| 5,577,526 A | 11/1996 | Kasugai et al. | |
| 5,582,198 A | 12/1996 | Nagino et al. | |
| 5,589,241 A | 12/1996 | Stiles et al. | |
| 5,598,870 A | 2/1997 | Nagino | |
| 5,598,872 A | 2/1997 | Kasugai et al. | |
| 5,621,176 A | 4/1997 | Nagano et al. | |
| 5,632,296 A | 5/1997 | Kasugai et al. | |
| 5,666,989 A | 9/1997 | Roetker | |

(Continued)

FOREIGN PATENT DOCUMENTS

EP    0742096 A2    11/1996

(Continued)

OTHER PUBLICATIONS

Verified English Translation of WO 01/21428 A1, published Mar. 29, 2001.

(Continued)

*Primary Examiner*—Kevin Lee
(74) *Attorney, Agent, or Firm*—Dority & Manning, P.A.

(57) ABSTRACT

A low permeation weldable fuel tank assembly is provided to reduce fuel vapor permeation from a fuel tank. The weldable fuel tank assembly has a mounting portion mountable to the fuel tank and a valve housing that is attachable to the mounting portion. The mounting portion includes a fuel vapor permeation barrier.

20 Claims, 5 Drawing Sheets

U.S. PATENT DOCUMENTS

| | | | |
|---|---|---|---|
| 5,687,756 A | 11/1997 | VanNatta et al. | |
| 5,687,778 A | 11/1997 | Harris | |
| 5,694,968 A | 12/1997 | Devall et al. | |
| 5,789,679 A | 8/1998 | Koshimizu et al. | |
| 5,803,131 A | 9/1998 | Iwasa et al. | |
| 5,944,044 A | 8/1999 | King et al. | |
| 5,975,116 A | 11/1999 | Rosas et al. | |
| 6,035,883 A | 3/2000 | Benjey | |
| 6,035,884 A | 3/2000 | King et al. | |
| 6,037,062 A | 3/2000 | Tsutsumi et al. | |
| 6,058,963 A | 5/2000 | Enge et al. | |
| 6,170,510 B1 | 1/2001 | King et al. | |
| 6,189,567 B1 | 2/2001 | Foltz | |
| 6,240,950 B1 | 6/2001 | Harris | |
| 6,286,539 B1 | 9/2001 | Nishi et al. | |
| 6,289,915 B1 | 9/2001 | Nulman et al. | |
| 6,305,568 B1 | 10/2001 | Suzuki et al. | |
| 6,408,867 B1 | 6/2002 | Aoki et al. | |
| 6,422,261 B1 | 7/2002 | DeCapua et al. | |
| 6,733,048 B1 * | 5/2004 | Kurihara et al. | 137/202 |
| 6,843,267 B1 * | 1/2005 | Van Schaftingen et al. | 137/202 |
| 2002/0011490 A1 * | 1/2002 | Nakamura et al. | 220/4.12 |
| 2003/0015526 A1 | 1/2003 | Nakaya et al. | |
| 2003/0094763 A1 | 5/2003 | Benjey | |
| 2003/0111111 A1 | 6/2003 | Zorine | |
| 2003/0198768 A1 | 10/2003 | Delbarre | |
| 2004/0124567 A1 * | 7/2004 | Stangier | 264/523 |

FOREIGN PATENT DOCUMENTS

| | | |
|---|---|---|
| EP | 0930190 A2 | 7/1999 |
| EP | 1179445 | 2/2002 |
| EP | 1084889 B1 | 8/2002 |
| EP | 0941884 B1 | 2/2003 |
| EP | 1291223 A2 | 3/2003 |
| EP | 1122113 B1 | 7/2004 |
| WO | WO 0121428 | 3/2001 |
| WO | WO 03008224 A1 | 1/2003 |

OTHER PUBLICATIONS

English language Abstract of Japanese Patent Publication No. 200304204, published Feb. 13, 2003, entitled "Mounting Structure for Liquid Shut-Off Valve Device".

* cited by examiner

LOW PERMEATION WELDABLE FUEL TANK ASSEMBLY

RELATED APPLICATIONS

The present application is a continuation-in-part application of and claims priority to U.S. patent application Ser. No. 10/356,380, filed Jan. 31, 2003, now U.S. Pat. No. 6,915,812.

FIELD OF INVENTION

The present invention relates to a weldable fuel tank assembly with a permeation barrier to reduce fuel vapor permeation from a fuel tank.

BACKGROUND OF THE INVENTION

In the field of automotive fuel systems, fuel tanks are made typically from a weldable polymeric material such as a high-density polyethylene (HDPE). A polymeric fuel tank is resistant to corrosion and can be efficiently manufactured, such as by blow molding, which permits flexibility in fuel tank design. Further, since the polymeric fuel tank is lightweight, the vehicle in which it is installed is more fuel efficient and economical to operate.

Relatively soft polymeric materials that lend themselves to efficient fuel tank manufacturing typically are not suitable for making quality fuel system components, such as vent valves. For instance, a vent valve made largely or entirely out of the same material as the fuel tank can be damaged using a conventional method such as hot plate welding to weld a port for the vent valve to the polymeric fuel tank. On the other hand, harder materials such as nylon with higher-melting temperatures suitable for use in the vent valve are difficult if not impossible to weld to the polymeric fuel tank. Nylon and HDPE, for example, simply do not weld together very well due to their different melting temperatures and other properties.

Various mounting assemblies have been proposed to overcome problems associated with mounting fuel system components, such as the nylon vent valve, in a wall of the polymeric fuel tank. However, due to the incompatibility of tank and fuel system component materials, interfaces continue to suffer from fuel vapor permeation problems permitting hydrocarbons to escape from the fuel tank.

Government regulations and environmental concerns will likely continue to require that fuel tanks and their components control hydrocarbon emissions. Therefore, a non-weldable vent valve structure is needed that can be efficiently produced and securely attached to a polymeric fuel tank to reduce fuel vapor permeation from the fuel tank.

BRIEF SUMMARY OF INVENTION

The present invention provides a weldable fuel tank assembly with a permeation barrier to reduce fuel vapor permeation from a fuel tank and methods of attaching such assemblies to fuel tanks. The component parts of the invention are simple, reliable, and economical to manufacture, assemble, and use. Other advantages of the invention will be apparent from the following description and the attached drawings, or can be learned through practice of the invention.

According to an aspect of the invention, a fuel system apparatus for weldable attachment to a fuel tank is provided. The fuel system apparatus has a valve assembly attachable to a mounting portion. The mounting portion is attachable to a surface of the fuel tank and has an inlet in communication with an inside of the fuel tank and an outlet for communicating fuel vapor from the fuel tank to a recovery canister. The mounting portion includes a laminate with multiple layers including a weldable layer. One of the layers is an anti-permeation layer such ethylene vinyl alcohol copolymer (EVOH) resin to block fuel vapor permeation from the mounting portion and the surface of the tank where the mounting portion is attached.

According to another aspect of the invention, a fuel system apparatus for weldable attachment to a fuel tank similar to the foregoing embodiment is provided. In this aspect of the invention, the fuel system apparatus includes a valve assembly attached to a mounting assembly. The mounting assembly has a body, a passageway within the body in communication with an inside of the fuel tank, an annular rib surrounding a portion of the passageway, and a weldable extension. The weldable extension includes a laminate, such as EVOH to block fuel vapor permeation from the fuel tank, and a weldable layer. The weldable extension is welded on a separate mount or directly to the fuel tank in which only its weldable layer is welded. An o-ring or similar device can be radially sealed by the extension to further reduce fuel or fuel-vapor permeation from about the tank surface in this aspect of the invention.

In a further aspect, a fuel system apparatus for a fuel tank is provided with a mounting assembly having a mount body, a weldable extension, and a laminate disposed thereon. The laminate includes a gas permeation layer to block fuel vapor permeation of the fuel tank. A mount is interposed between the extension and the fuel tank and welded to the fuel tank. A heat stake or similar device is used to connect the mount body and the weldable extension. A valve assembly is included and attached to the mounting assembly.

According to another aspect of the invention, a fuel vapor control valve for weldable attachment to a fuel tank is provided, which includes a mounting portion connectable to a surface of the fuel tank, a valve assembly attached to the mounting portion for selectively opening and closing the flow through the passageway, and an anti-permeation portion attached to and substantially covering the mounting portion spaced apart from the surface of the fuel tank. The mounting portion has a weld foot weldable to a surface of the fuel tank. The anti-permeation portion has a multi-layer laminate to block fuel vapor permeation from the fuel tank.

Further, in this aspect, the fuel system apparatus includes a nozzle with an outlet in communication with an atmosphere apart from the fuel tank. The nozzle can be connected to the mounting portion after the mounting portion if formed. Also, the nozzle may include a metal sleeve or the like disposed in the nozzle to increase rigidity of the nozzle.

In yet another aspect, a method for attaching an anti-permeation portion to a fuel vapor control valve for weldable attachment to a fuel tank is provided, which includes the steps of providing a mounting portion connectable to a surface of the fuel tank, the mounting portion having a weld foot weldable to the surface; providing an anti-permeation portion for attachment to the mounting portion; and attaching the anti-permeation portion to the mounting portion such that the anti-permeation portion is spaced apart from the surface, wherein the anti-permeation portion is configured to block fuel vapor permeation from the fuel tank, the anti-permeation portion comprising a multi-layer laminate.

As in the previous embodiments, the multi-layer laminate according to the exemplary method can include EVOH or a similar material or device to reduce or prevent gas permeation from the fuel tank.

The method may also include the steps of inserting a nozzle in the mounting portion subsequent to or substantially simultaneously with attaching the anti-permeation portion; and inserting a sleeve in the nozzle to increase a rigidity of the nozzle.

In another aspect of the invention, a fuel system apparatus for a fuel tank is provided for vapor communication with a fuel vapor recovery device. The fuel system apparatus includes a mounting assembly with a mount body, a weldable extension, and one or more permeation barriers located within the weldable extension. The weldable extension is weldable to a fuel tank wall at a weldpoint. A valve assembly in this aspect of the invention is attached to the mount body and is at least partially disposed in the fuel tank interior. The valve assembly selectively opens or closes communication between the fuel tank interior and the fuel vapor recovery device. Means for connecting the mount body and the valve assembly together are provided such as snap-fit, screw-in or weldable arrangements.

More particularly, in this aspect the fuel system apparatus has a weldable extension made of a weldable material and the permeation barrier is made of an anti-permeation material. The permeation barrier is spaced apart from the weldpoint to block fuel vapor permeation from a fuel tank interior. The permeation barrier can be extruded within the mount body between at least two layers of the weldable material, or at least two permeation barriers can be spaced apart from each other each between two respective layers of the weldable material. By way of further example, the permeation barrier can form a U- or V-shape cross-section within the weldable material at least within the weldable extension. A bottom area of the U-shaped permeation barrier extends in a direction of the fuel tank wall close to but spaced apart from the weldpoint sufficiently to prevent unwanted melting or contamination of that part of the permeation barrier.

Also in this aspect of the invention, the fuel system apparatus can include a nozzle depending from the mount body in which the permeation barrier is located very near an interior surface of the nozzle to block fuel vapor permeation from the nozzle.

In yet another aspect of the invention, a fuel system apparatus is provided, which includes a valve assembly disposed in an interior of the fuel tank, the fuel system apparatus comprising a mount body made of a weldable material and an anti-permeation material, the mount body connected to a valve and welded to a tank wall at a weldpoint, the anti-permeation material embedded in the weldable material such that the anti-permeation material is spaced apart from the weldpoint. The weldable material and the anti-permeation material are co-extruded. The anti-permeation material is disposed between at least two layers of the weldable material, wherein the weldable material is HDPE and the anti-permeation material is EVOH.

In still a further aspect of the invention, the fuel system apparatus comprises a mount body defining a passageway in communication with an interior of the fuel tank, the mount body formed from multiple layers of material including at least one layer of an anti-permeation material configured to block fuel vapor permeation, the mount body further including a weld foot configured for welding to a surface of the fuel tank at a weldpoint, the anti-permeation layer being co-extruded at least within the weld foot and disposed within the weld foot such that the anti-permeation layer is spaced apart from the weldpoint; and a valve assembly attached to the mounting portion and at least partially disposed in the inside of the fuel tank and configured to selectively open or close communication between the passageway to the inside of the fuel tank. In the fuel system apparatus, the material of the multiple layers can be a polymer, a metal, an adhesive, or combinations of these materials, including combinations with the anti-permeation material. Preferably, the weldable material in this aspect surrounds the anti-permeation layer, which can be EVOH.

Another embodiment of the invention is directed to a fuel system apparatus for a fuel tank in communication with a fuel vapor recovery device. In this aspect of the invention, the fuel system apparatus includes a mounting assembly defining a mount body, a weldable extension, and at least one permeation barrier located or embedded at least within the weldable extension. As described above, the permeation barrier can be any anti-permeation material such as EVOH for blocking fuel vapor permeation from a fuel tank interior. The permeation barrier can be located within the mount body such as between at least two layers of the weldable material. Additionally, two or more permeation barriers can be spaced apart from each other each between two respective layers of the weldable material.

In one aspect, the permeation barrier can be formed substantially in a U-shape cross-section within the weldable material at least within the weldable extension and can also extend at or near a nozzle surface of a nozzle of the apparatus. A bottom area of the U-shaped permeation barrier extends in a direction of the fuel tank wall but is spaced apart from the weldpoint. The weldable extension can be welded to a fuel tank wall at a weldpoint, so the permeation barrier is spaced apart from the weldpoint at a sufficient distance to avoid being melted or corrupted by heat from the weld.

Also in this aspect, the fuel system apparatus includes a valve assembly attached to the mount body and at least partially disposed in the fuel tank interior. The valve assembly selectively opens or closes communication between the fuel tank interior and the fuel vapor recovery device. The mount body and the valve assembly can be connected together by snaps, helical screws, welds and the like or combinations of these connecting devices and methods. For instance, the respective opposing ribs depending from the mount body and the valve assembly can be used to interlock the mount body and the valve assembly together.

In another aspect of the invention, a fuel system apparatus for a fuel tank including a valve assembly is located in an interior of the fuel tank. The fuel system apparatus includes a mount body made of a weldable material and an anti-permeation material, which may be co-extruded. The mount body is connected to a valve and welded to a tank wall at a weldpoint. In this aspect, the anti-permeation material is embedded in the weldable material such that the anti-permeation material is spaced apart from the weldpoint.

In a further aspect of the invention, a fuel system apparatus for a fuel tank includes a mount body with a passageway in communication with an interior of the fuel tank. The mount body is formed from multiple layers of material including at least one layer of an anti-permeation material for blocking fuel vapor permeation. More specifically, the material of the multiple layers can be a polymer, a metal, an adhesive, and combinations of these materials including combinations with the anti-permeation material.

Also in this aspect, the mount body includes a weld foot for welding to a surface of the fuel tank at a weldpoint. In one aspect, the mount body is unitarily formed with the weld foot. In another aspect, the anti-permeation layer is co-extruded at least within the weld foot and located within the weld foot such that the anti-permeation layer is spaced apart from the weldpoint. Moreover, the weldable material surrounds the anti-permeation layer in this aspect of the invention. In a further aspect, the anti-permeation material is located only in the weld foot.

A valve assembly in this aspect of the invention is attached to the mounting portion and is at least partially located in the inside of the fuel tank for selectively opening or closing communication between the passageway to the inside of the fuel tank.

Additional features and advantages of the invention will become apparent to those skilled in the art upon consideration of the attached drawings in conjunction with the following detailed description of the drawings, which exemplifies the best mode of carrying out the invention as presently perceived, or can be learned through practice of the invention.

BRIEF DESCRIPTION OF THE DRAWINGS

The above and other aspects and advantages of the present invention are apparent from the detailed description below and in combination with the drawings in which.

The detailed description below uses numerical and letter designations to refer to features in the drawings. Like or similar designations in the drawings and description have been used to refer to like or similar parts of the invention.

DETAILED DESCRIPTION OF THE DRAWINGS

Figure 1:
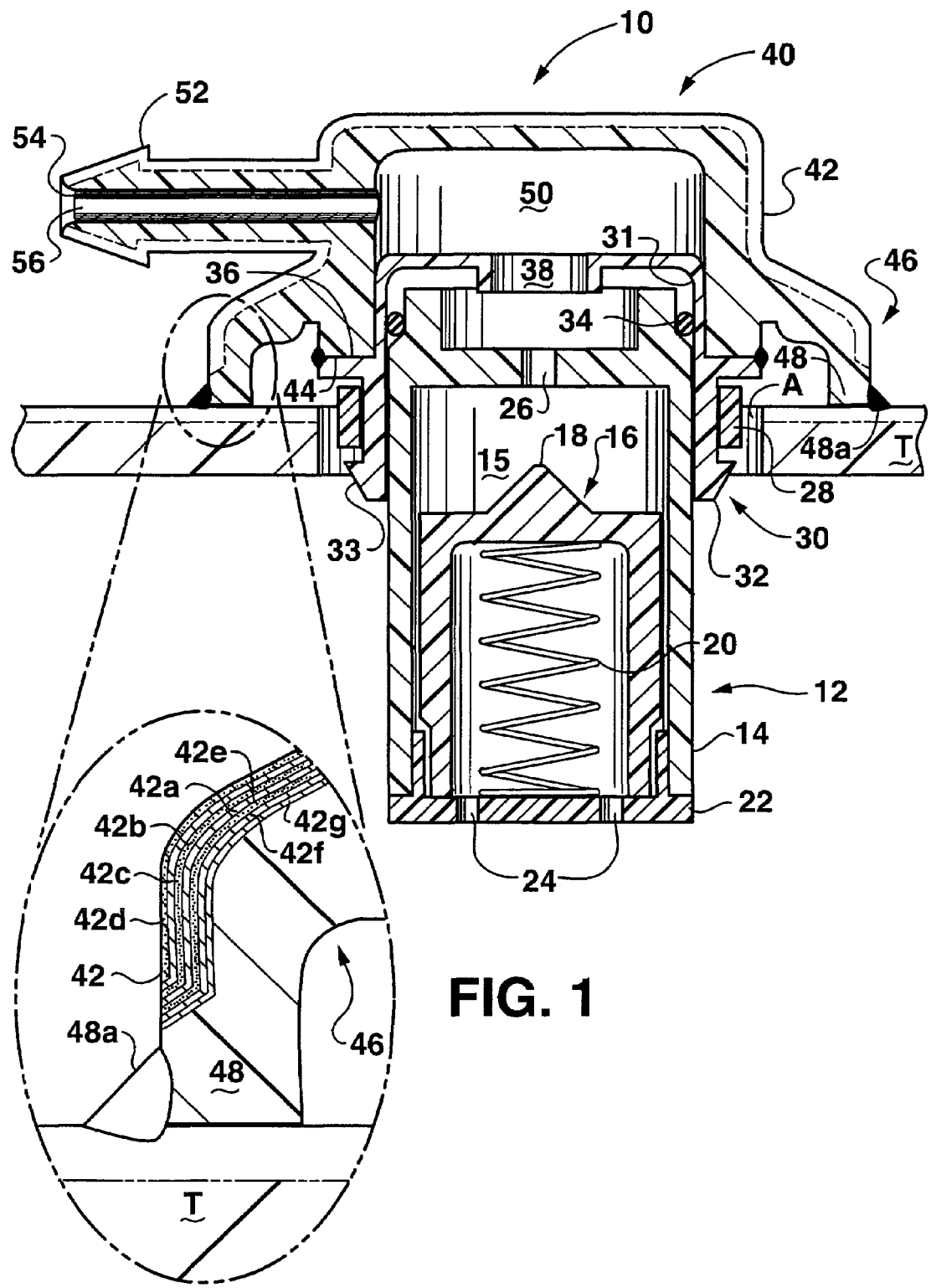
FIG. 1 is a sectional elevational view of one embodiment of an assembly particularly showing a multi-layer permeation barrier in accordance with an aspect of the present invention.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in the Figures, a fuel system apparatus is provided with a multi-layer permeation barrier to reduce fuel vapor permeation from a fuel tank. The fuel tank may be made of a weldable material such as high-density polyethelene (HDPE) although other polymers or metals such as stainless steel, aluminum, a non-corrosive alloy or combinations of these and other materials suitable for welding fuel system components to the fuel tank can be used. The fuel system apparatus includes a connection or mounting portion, and a valve having a float or valve member movably disposed in a chamber of a valve housing. The mounting portion is mountable to a wall of the fuel tank, and the valve is attachable to the mounting portion.

The permeation barrier depicted in the Figures is disposed on the mounting portion or sections of the mounting portion, a mount separate from the mounting portion, and various other elements, depending on the materials utilized to form the elements. As discussed in greater detail below, the permeation barrier can be applied to the various elements by a spray, a lamination, a dip/bath, an extrusion, a molding, and/or an adhesive process and the like. Therefore, it should be understood that the following descriptive examples of the invention are not intended to limit the present invention to use only as shown in the Figures.

With general reference to FIG. 1, according to one embodiment of the invention, a weldable fuel system apparatus 10 is attached to a fuel tank T via an aperture A in the fuel tank T. The fuel system apparatus 10 includes a valve assembly ("valve") 12, an interface 30, and a mounting body or portion 40. The mounting portion 40 in this aspect is welded to the tank T and includes a barrier 42 that acts as a vapor penetration or permeation barrier against fuel vapor permeation from the fuel tank T. Exemplary applications and operations of the barrier 42 are described in greater detail below.

FIG. 1 shows that the valve assembly 12 has a housing 14 that is at least partially disposed in an inside of the fuel tank T. The valve 12 may be positioned and sized as depicted in FIG. 1, for instance, to control a fuel level (not shown) or to shut off fuel flow in the event of a rollover. The housing 14 of the valve 12 defines a chamber 15 in which a valve member or float 16 is operably disposed to selectively open or close communication between the inside of the fuel tank T and an external atmosphere. The float 16 is held in the chamber 15 by a retainer 22, which is mounted to the housing 14 by tabs and/or slots (not shown), adhesives, and similar mechanisms. Conversely, the housing 14 and the retainer 22 can be unitarily constructed. In this aspect of the invention, the housing 14 is constructed of POM (polyoxymethylene (acetal plastic)), nylon, PEEK (polyetheretherketone), or other thermoplastics suitable for the non-weldable valve 12.

The float 16 has a sealing element 18, which can be a point, a needle, a cone, a flat surface, or any shape or separate piece suitable to close an opening 26 in the housing 14 in order to control fuel filling or to shut off fuel flow in the event of a rollover. An exemplary operation of this aspect of the invention will be described in greater detail below. A plurality of apertures or slots 24 are defined in the retainer 22 to permit fuel and fuel vapor to enter the housing 14 and allow fuel vapor to discharge through the opening 26 and/or to act upon the float 16 to seal the opening 26. It should be noted that the quantity and shape of slots 24 are not limited to the example shown in FIG. 1. For instance, at least one of the slots 24 could be disposed on a portion of the housing 14.

FIG. 1 further shows that the housing 14 is releasably attached and axially secured to the interface 30 via a plurality of bayonets 32. The bayonets 32 are snap-fitted, for example, into a circumferential belt or a plurality of receptacles 28 disposed about the housing 14. The bayonets 32 may include beveled edges 33 and/or the receptacles 28 may include chamfered edges (not shown) to allow the bayonets 32 to be more easily slid into the receptacles 28. It is to be noted that any or all of the receptacles 28 and the bayonets 32 could be reversed such that at least one of the receptacles 28 is disposed on the interface 30 and at least one of the bayonets 32 is on the housing 14. Similarly, the invention contemplates that the receptacles 28 and the bayonets 32 may have alternately other complimentary shapes, such as dimples, ridges, arcs, spherical sections and the like.

While attaching the housing 14 to the interface 30 via the receptacle 28 and bayonet 32 combination, a seal 34, such as an o-ring, gasket, sealant, or the like, may be placed around the housing 14 in contact with an inner surface 31 of the interface 30 to further seal the housing 14 and the interface 30 together and reduce fuel vapor permeation. The interface 30 is in turn welded to the mounting portion 40. In this example, the interface 30 has a mating surface 36 that, like the mounting portion 40, is made of weldable HDPE. The mating surface 36 is welded to a complementary mating surface 44 of the mounting portion 40.

FIG. 1 further shows the fuel vapor laminate or barrier 42 disposed on the mounting portion 40 to make the mounting portion 40 less permeable than HDPE alone. In the example shown, the barrier 42 may have multiple layers including, for instance, an ethylene vinyl alcohol copolymer (EVOH) resin, depicted here as layer 42*a* (see FIG. 1 inset). EVOH is characterized by its gas barrier properties and its resistance to solvents, chemicals and the like.

The EVOH layer 42*a* in the present example is about 0.06 millimeters thick since industry and government tolerances require that fuel tank systems discharge no more than about 5 milligrams per day of fuel vapor hydrocarbons. However, the layer 42*a* can have varying thickness such as between about 0.001 millimeters to about 5 millimeters to meet more or less stringent permeation requirements. The exemplary EVOH resin is available, for instance, under the brand name EVAL™ from EVAL Europe N.V. in Zwijndrecht, Belgium, although comparable sources may be substituted. Likewise, although EVOH is used as layer 42*a*, any resin or material with suitable gas barrier properties can be substituted for the layer 42*a* within the scope of the invention.

The layer 42*a* is co-extruded with a layer 42*c* of HDPE to protect the EVOH from external wear. A layer of adhesive 42*b* is also co-extruded and disposed between the layers 42*a* and 42*c* to adhere the HDPE and EVOH together since HDPE and EVOH are not chemically bonded. An adhesive suitable as adhesive 42*b* is available under the brand name ADMER™ GT6E resin from Mitsui Chemicals Europe GmbH of Duesseldorf, Germany. However, it is to be noted that any comparable adhesive suitable for adhering layers 42*a*, 42*c* together can be used according to the present invention. It is to be further noted that although the layers 42*a*–*c* are co-extruded, other processes such as laminations, baths, sprays, overmolding, and the like can be used to form the multi-layer barrier 42.

For further clarity, the inset in FIG. 1 shows the multiple layers of the barrier 42. Specifically, the inset shows an enlarged portion of a weldable concentric ring or extension 46 of the mounting portion 40. In this example, the extension 46 defines a weld foot 48 having a weldable layer 48*a* formed from HDPE. The barrier 42 is disposed on the extension 46 proximate the weld foot 48. The barrier 42 includes the inner layer of EVOH 42*a*, the adhesive layer 42*b*, the layer of HDPE 42*c*, an outer layer of conductive HDPE 42*d*, another adhesive layer 42*e*, another inner layer of HDPE 42*f*, and another outer layer of conductive HDPE 42*g*, which is ultrasonically welded to the extension 46. In this example, a specific extruder (not shown) used to form the barrier 42 optionally provides the conductive HDPE layers 42*d*, 42*g*.

The inset of FIG. 1 also shows that the exemplary barrier 42 angles away from the tank T at about 45° on the extension 46 proximate the weld foot 48. This arrangement spaces the barrier 42 apart from the tank T, which permits the weldable layer 48*a* of the weld foot 48 to be welded via a weldpoint 48*b* to the tank T. In other words, the multi-layer barrier 42 does not interfere with welding the weld foot 48, but the barrier 42 is positioned to counteract permeation from the fuel tank T.

Although the barrier 42 terminates at about a 45° angle near the weldpoint 48*b* in the FIG. 1 inset, the barrier 42 may have any termination angle, such as between about 90° to about 270° approximately parallel to the tank T. Alternatively, the barrier 42 can be angled in a substantially opposite direction away from the weldpoint 48*b*, such as to about 315° to about 350°. Moreover, the barrier 42 may not be curved at all but may be applied on a tank port with a different aspect angle; i.e., the tank port can have a straight edge substantially perpendicular to the tank T such that the barrier 42 would be flatly applied to the tank port such that only the weldable portion of the barrier 42 is welded to the surface of the fuel tank T.

Moreover, although the barrier 42 in FIG. 1 is applied to substantially the entire mounting portion 40, including the nozzle 52 in this example, the barrier 42 can be selectively applied to specific elements. For instance, if the nozzle 52 is made of POM, an additional gas permeation barrier such as barrier 42 may not be required, and it may be desirable to apply the barrier 42 only to the extension 46 as described above. Further, instead of or in addition to applying the barrier 42 on an external surface of the mounting portion 40 as depicted, the barrier 42 can be applied on an opposing or internal surface of the mounting portion 40 or elements thereof, or in one or more of the components as described in detail with respect to FIG. 5 below.

The foregoing embodiment may be better understood with reference to an exemplary operation. As shown in FIG. 1, the fuel system apparatus 10 is in an open condition, which permits fuel vapor from the fuel tank T to enter through the slots 24 and continue through the opening 26 and a gap 38 of the interface 30 into a passageway 50 of the nozzle 52. The fuel vapor then continues via an outlet 56 of the nozzle 52 to a fuel vapor recovery device (not shown), for example, to evacuate fuel vapor from the inside of the fuel tank T. If desired, a sleeve 54 formed of metal or other hardened material can be inserted in the nozzle 52 for additional rigidity to strengthen the nozzle 52.

When an operator (not shown) fills the tank T with fuel, the rising fuel may contact the float 16. As the fuel rises, it enters the slots 24 and contacts the float 16. In this aspect of the invention, the float 16 is heavier than the fuel; therefore, a spring 20 is inserted in float 16 to urge the float 16 in a direction of the opening 26. The combination of the rising fuel and a spring constant of the spring 20 eventually overcomes a preset weight of the float 16 and urges the float 16 into an engagement with or about the opening 26. When the float 16 is buoyed against the opening 26, the sealing element 18 at least momentarily closes the opening 26, which closes the fuel system apparatus 10. It should also be noted that the float 16 could close the opening 26 when the fuel tank T is inclined beyond a preset inclination level greater than, for example 60°. Such an inclination angle might occur if the vehicle rolls over or is on a grade or hill. In these cases, the inclination angle would cause the fuel to contact float 16 and drive the float 16 in the direction of the opening 26 as described.

Figure 2:
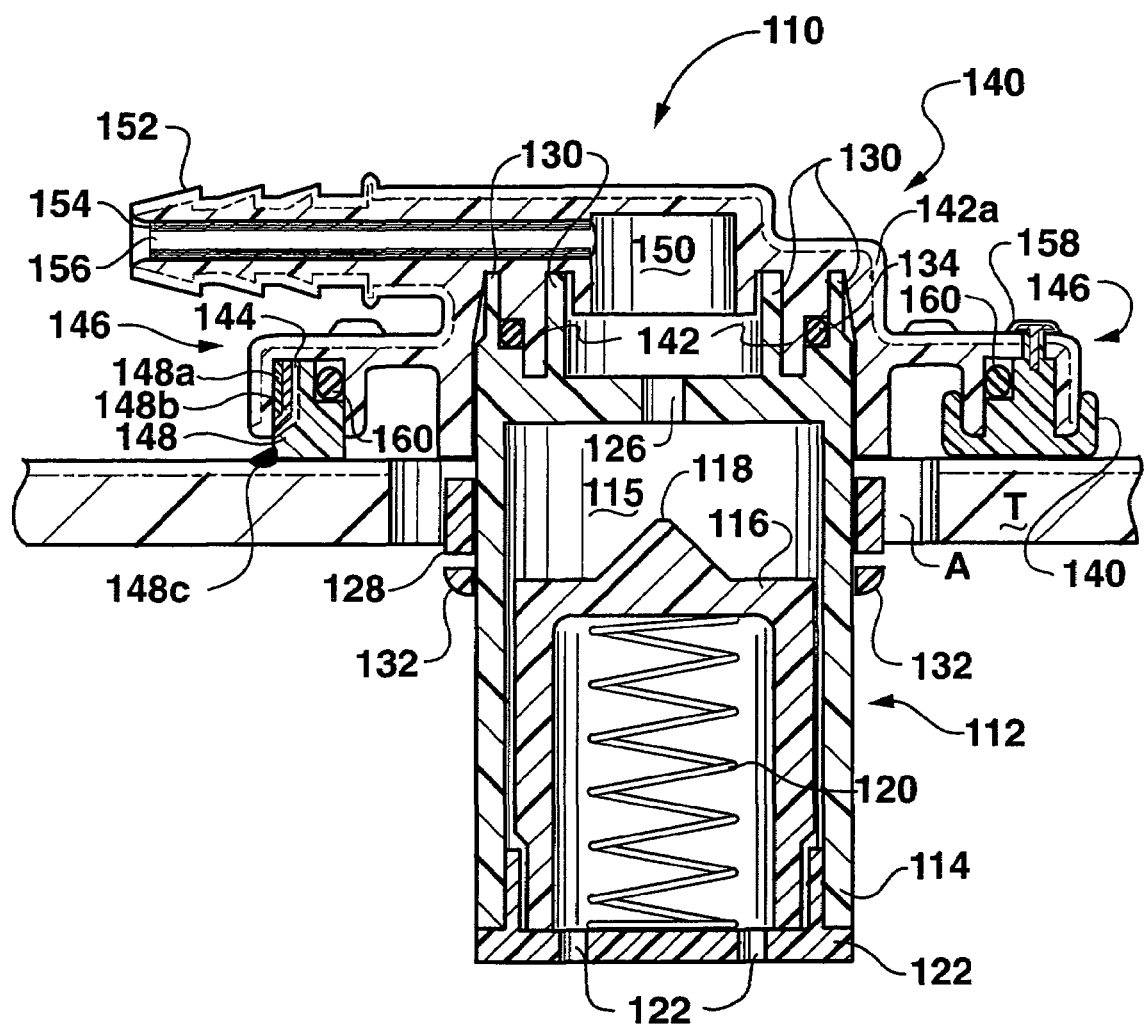
FIG. 2 is a sectional elevational view of another embodiment of an assembly.

FIG. 2 shows another aspect of the invention. Here a weldable fuel system apparatus 110, in some ways similar to the previous embodiment, is attached to the tank T using a circumferential extension 146, a circumferential weldable mount 148 and/or a circumferential weldable mount 149 with a plurality of heat stakes 158. In other words, the extension 146 may in one aspect be ultrasonically mounted to mount 148 (see left side of FIG. 2); or in another aspect, the extension 146 may be mechanically attached to mount 149 (see right side of FIG. 2); or in a further aspect, the extension 146 may be mounted using a combination of these arrangements. These alternative mounting arrangements are discussed in greater detail below.

With further reference to FIG. 2, the fuel system apparatus 110 includes a valve 112 with a housing 114 made of POM in this aspect. The fuel system apparatus 110 further includes a mounting body or portion 140 made of POM, nylon, or any material suitable to prevent fuel vapor permeation. Accordingly, an HDPE part, such as the mount 148, 149, is desirable to mount the fuel system apparatus 110 to the tank T. As depicted in FIG. 2 and detailed below, the mounts 148, 149 are sealed utilizing an o-ring 160, which is radially sealed by the extension 146.

The weldable mount 148 includes the multi-layer barrier 142a, which is spaced apart from the tank T in the form and manner described with respect to the previous embodiment. That portion of the weldable mount 148 lacking an anti-permeation layer of the barrier 142a is welded to the tank T. The o-ring 160, which may also be a sealant, a gasket or the like as previously described, will be inserted between the extension 146 and the weldable mount 148 to create a fuel and fuel-vapor seal.

The extension 146 can be mechanically attached to the mount 149 with a heat stake 158, which can extend through the mount 149 into the tank T if desired. The heat stake 158 can be a rivet, a screw, a pin, or a solder joint and the like. Again, the extension 146, the mount 149, and the heat stake 158 may incorporate the o-ring 160 to further seal against fuel permeation to an external atmosphere. Moreover, the heat stake 158 may be coated with the barrier 142a to further limit fuel vapor permeation from the fuel tank T.

FIG. 2 further shows a circumferential belt or a plurality of tabs 128 of the housing 114 inserted or snap-fitted into a circumferential complementary ring plurality of receptacles 132 to hold the housing 114 to the mounting portion 140. In this aspect, the housing 114 includes a plurality of circumferential or annular ascending ribs 130 made of POM or the like that are complementarily inserted proximate a descending rib 142 of the mounting portion 140. The descending rib 142 is HDPE, which is fitted against the ascending ribs 130.

Alternative arrangements are contemplated in which the ascending ribs 130 and the descending ribs 142 are made of the same material but are sized differently such that the smaller, thinner circumferential rib expands more readily than its larger, thicker counterpart. Moreover, modifications and variations of the geometries and materials of the ribs 130, 142 can be made within the scope of the invention to achieve the same purpose. It is to be noted that the exemplary terms ascending and descending are not meant as limitations of the invention but are merely utilized to provide a full and enabling disclosure; thus, the weldable fuel system apparatus 110 and/or its ribs 130, 142 are not intended to be limited only to an upright orientation in a top wall of the fuel tank T.

Figure 3:
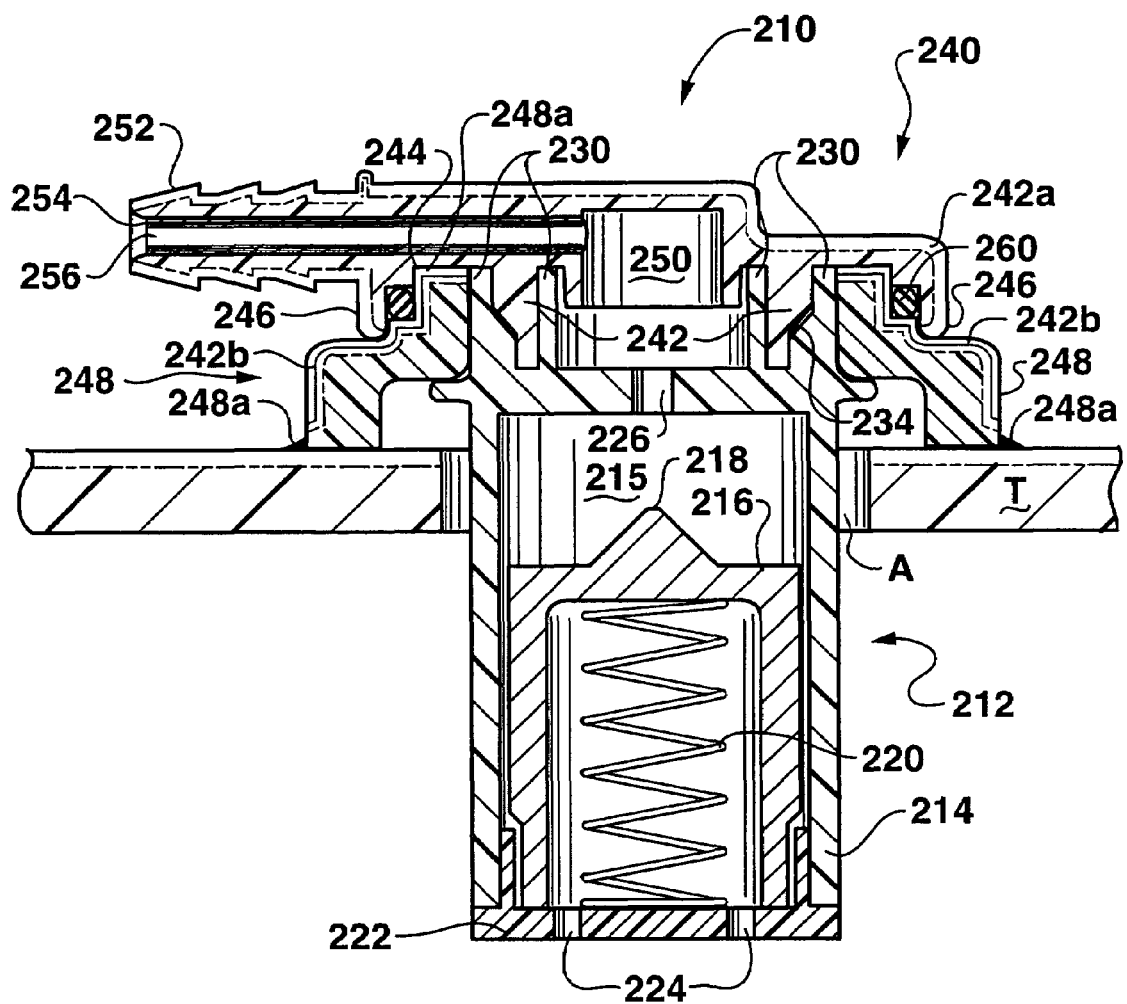
FIG. 3 is a sectional elevational view of a further embodiment of an assembly.

FIG. 3 shows an alternative embodiment for a fuel tank apparatus 210 that includes a barrier 242a and an annular extension 246. The barrier 242a is similar to the previously described embodiments and reference is made to the foregoing multi-layer description for further details. In this aspect of the invention, the mounting portion 240 is attached to a circumferential weldable mount 248 via the extension 246. The weldable mount 248 also includes the multi-layer barrier 242a as previously described and reference is made thereto. The weldable mount 248 is attached to the mounting portion 240 by a press-fit and then mounted to the tank T, such as by ultrasonic welding or clipping. Additionally, an o-ring 260 or similar device may be placed about and between the weldable mount 248 and the extension 246 to seal the components together to prevent fuel and/or fuel vapor permeation from the fuel tank T.

Similar to the embodiment described with respect to FIG. 2 above, in this aspect of the invention, a circumferential descending rib 242 of the mounting portion 240 is complementarily mated against ascending circumferential ribs 230 of the housing 214. The mounting portion 240 and rib 242 are made, for example, of acetal plastic or POM while the housing 214 and its ribs 230 are, e.g., POM or nylon. As previously described, the different heat reactive materials, shapes, sizes, or orientations of ascending ribs 230 and the descending rib 242 may cause the ribs 230, 242 to compress together to create a seal 234 such as when operation of the vehicle or external weather conditions heat the ribs 230, 242. Further operation of this exemplary embodiment is substantially similar to the foregoing embodiments and reference is made to the previous descriptions for further details.

Figure 4:
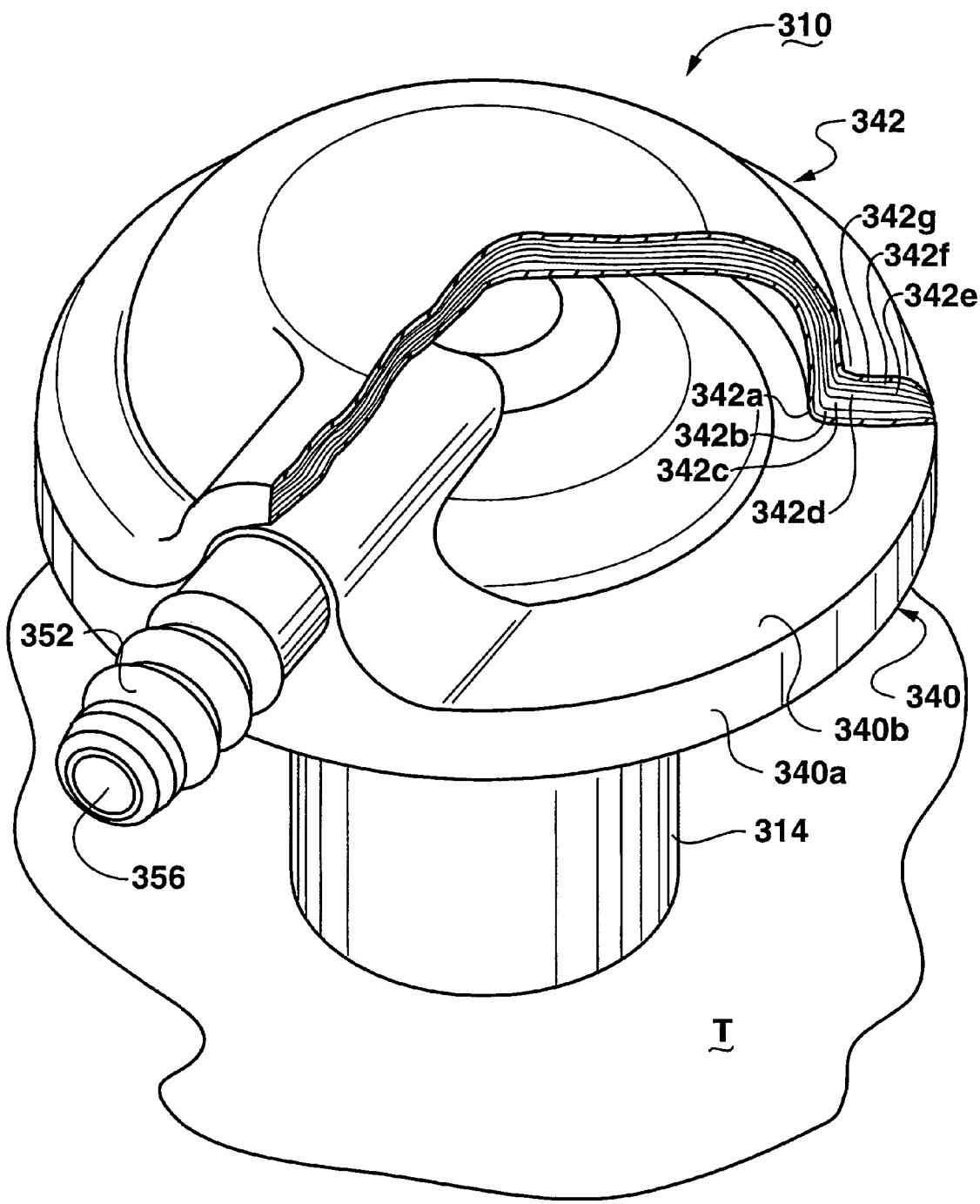
FIG. 4 is a perspective view of an assembly according to another aspect of the present invention.

FIG. 4 shows another aspect of the invention. This embodiment of a weldable fuel tank valve apparatus 310 includes a valve housing 314 attached to a mounting portion 340, which has a weldpad 340a for welding to a fuel tank T. As described above, HDPE may be used for one or both of the weldpad 340a and the fuel tank T, although other suitable materials may be substituted.

The valve apparatus 310 is in some ways similar to the previously described embodiments. In this aspect of the invention, an anti-permeation portion or cap 342 is attached to a surface 340b of the mounting portion 340 to provide a fuel vapor permeation barrier about the fuel system apparatus 310. In a further aspect, an exemplary HDPE nozzle 352 is inserted in the mounting portion 340 after the mounting portion 340 is formed and subsequent to or simultaneously with attachment of the cap 342.

Similar to the multi-layered permeation barriers previously described, the cap 342 in this example is formed of three to seven layers, more particularly ten layers, of various materials. For example, the cap 342 includes an innermost layer of conductive HDPE 342a, which is welded to the surface 340b. The cap 342 further includes a layer of HDPE 342b, an adhesive layer 342c, a layer of EVOH 342d, another adhesive layer 342e, another layer of HDPE 342f, and an outer layer of conductive HDPE 342g. As in the previous embodiment, the adhesive layers 342c, 342e are co-extruded with the EVOH layer 342d to bind the HDPE layers 342b, 342f to layer 342d since EVOH and HDPE are not chemically bonded. It is to be noted that the cap 342 may include fewer or additional layers of polymers, metals, adhesives, and anti-permeation materials other than the exemplary HDPE and EVOH layers provided in this example.

Also in this aspect of the invention, the cap 342 is attached to the surface 340b by an adhesive, a weld such as an ultrasonic or hot plate weld, or by a mechanical device, such as screws, rivets, pins, and the like. If the cap 342 is hot plate welded, for instance, only that portion without a permeation layer is welded to the surface 340b. Further details are not necessary for one skilled in the art to understand how to attach the cap 342.

Figure 5:
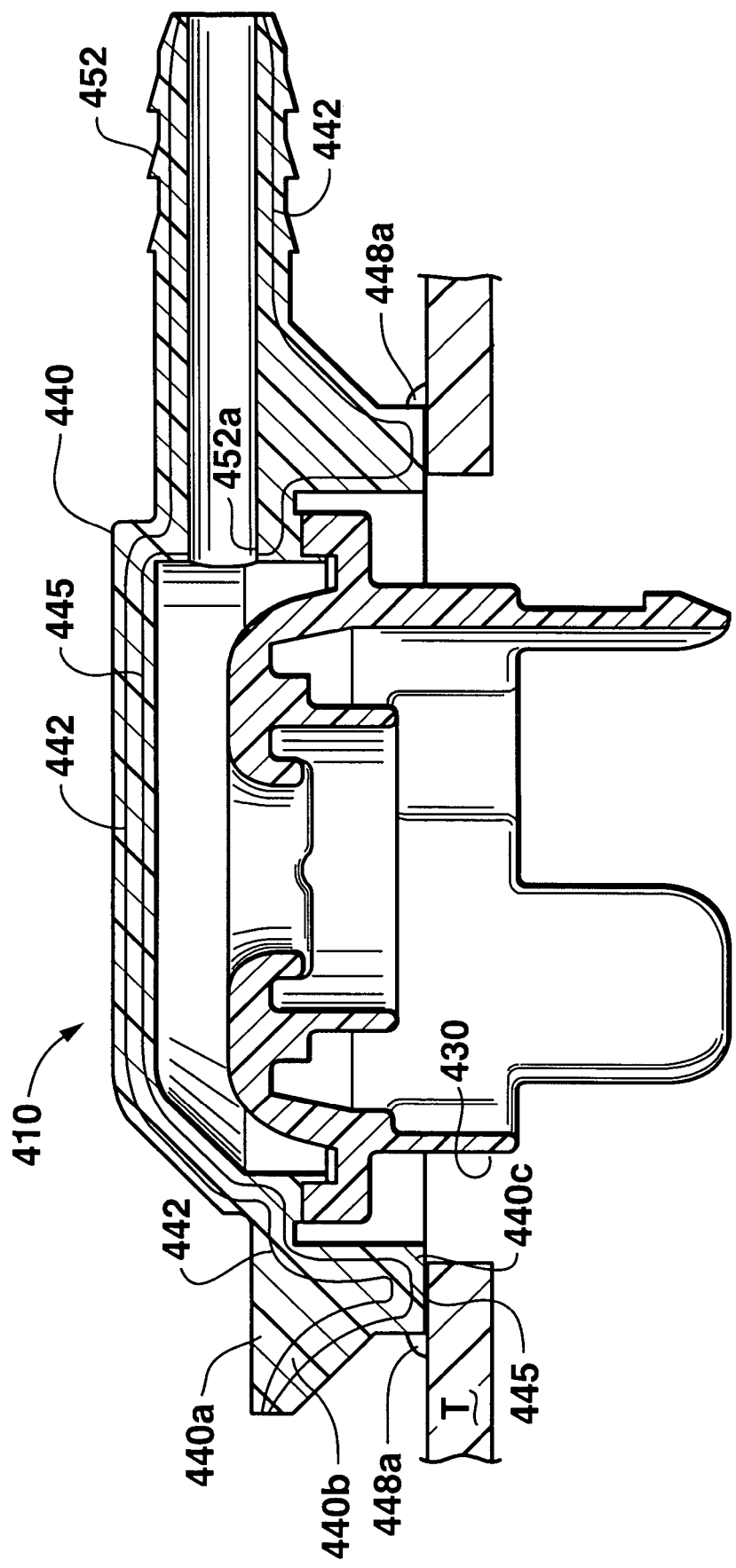
FIG. 5 is a sectional elevational view of a portion of an assembly of another embodiment of the invention.

In another embodiment of the invention, a valve apparatus 410 is shown in FIG. 5. The valve 410 is similar in some ways to the embodiments described above. Therefore, reference is made to the previous embodiments for details of similar components, their assembly and interoperation if not discussed below.

As shown in FIG. 5, the valve apparatus 410 includes an interface or adapter 430 attached to a mount body or mounting portion 440 such as by hot-plate or ultrasonic welding. Similar to embodiments previously described, the adapter 430 is used for instance to connect the weldable mounting portion 440 to a nonweldable valve housing (not shown but see e.g., housing 14 in FIG. 1). The skilled artisan will instantly recognize that in lieu of or in addition to the adapter 430, the weldable mounting portion 440 could be attached directly to the valve housing such as by snap-fitting devices and using o-rings and the like.

The mounting portion 440 in this aspect of the invention can be HDPE or other weldable material co-extruded with an anti-permeation material or barrier 442. The anti-permeation barrier 442, similar to the barrier 42 described above, can include multiple layers such as EVOH resin. Also discussed above, EVOH is utilized for its gas barrier properties to restrict fuel vapors from permeating the HDPE of the mounting portion 440.

As clearly shown in FIG. 5, the anti-permeation barrier 442 is co-extruded within an interior of the mounting portion 440 to block fuel vapors from permeating beyond the mounting portion 440 to atmosphere. More particularly, the anti-permeation barrier 442 can be coextruded throughout approximately the middle of the mounting portion 440 to protect the anti-permeation barrier 442 from physical wear and tear and from contact with damaging chemicals and solvents. As shown in this example, the anti-permeation barrier 442 is sandwiched between a first layer of HDPE material 440a and a second layer of HDPE material 440b. Also in this aspect of the invention, a portion of the anti-permeation barrier 442 can be embedded near or at an inner surface 452a of a nozzle 452.

As shown more particularly in FIG. 5, the anti-permeation barrier 442 also comes close to a weldpoint 448a on a tank surface T, but curves away from the weldpoint 448a to avoid corrupting the anti-permeation barrier 442 when that portion of the mounting portion 440 is heated to form the weldpoint 448a. In other words, the anti-permeation barrier 442 is spaced at a sufficient distance between the first and second layers of HDPE 440a,b and apart from the weldpoint 448a to avoid melting or otherwise adversely affecting the anti-permeation barrier 442 and its anti-permeation properties.

In a further aspect of the invention shown in FIG. 5, a second anti-permeation barrier 445 is spaced apart from the first anti-permeation barrier 442 to provide additional protection against fuel vapor permeation. In this example, the anti-permeation barrier 445 is sandwiched between the second layer of HDPE 440b and a third layer of HDPE 440c. Like the first anti-permeation barrier 442, the second anti-permeation barrier 445 is spaced apart from the weldpoint 448a to prevent adversely affecting the anti-permeation properties of the anti-permeation barrier 445.

More specifically, in this aspect of the invention as the anti-permeation material is co-extruded with HDPE, a single anti-permeation layer is sandwiched between two HDPE layers, but to form the mounting portion 440, the layers are folded back on top of themselves to form, for instance, the two anti-permeation barriers 442, 445 as shown in FIG. 5. The skilled artisan will instantly appreciate that additional anti-permeation barriers with various orientations can be formed between additional layers of HDPE to provide additional anti-permeation boundaries.

While exemplary embodiments of the invention have been shown and described, those skilled in the art will recognize that other changes and modifications may be made to the foregoing examples without departing from the scope and spirit of the invention. For instance, specific shapes of various elements of the illustrated embodiments may be altered to suit particular applications. It is intended to claim all such changes and modifications as fall within the scope of the appended claims and their equivalents.

That which is claimed is:

1. A fuel system apparatus for a fuel tank in communication with a fuel vapor recovery device, the fuel system apparatus comprising:
   a mounting assembly defining a mount body, a weldable extension, and at least one permeation barrier disposed at least within the weldable extension, the weldable extension configured for welding to a fuel tank wall at a weldpoint, the permeation barrier spaced apart from the weldpoint and configured to block fuel vapor permeation from a fuel tank interior;
   a valve assembly attached to the mount body and at least partially disposed in the fuel tank interior, the valve assembly configured to selectively open or close communication between the fuel tank interior and the fuel vapor recovery device; and
   means for connecting the mount body and the valve assembly together.

2. The fuel system apparatus as in claim 1, wherein the weldable extension is made of a weldable material and the permeation barrier is made of an anti-permeation material.

3. The fuel system apparatus as in claim 2, wherein the permeation barrier is disposed within the mount body.

4. The fuel system apparatus as in claim 2, wherein the permeation barrier is disposed between at least two layers of the weldable material.

5. The fuel system apparatus as in claim 4, wherein the permeation barrier forms substantially a U-shape in cross section within the weldable material at least within the weldable extension, a bottom area of the U-shaped permeation barrier depending in a direction of the fuel tank wall but spaced apart from the weldpoint.

6. The fuel system apparatus as in claim 2, wherein at least two permeation barriers are disposed apart from each other each between two respective layers of the weldable material.

7. The fuel system apparatus as in claim 2, wherein the permeation barrier is EVOH.

8. The fuel system apparatus as in claim 1, wherein the means for connecting are respective opposing ribs depending from the mount body and the valve assembly, opposing ribs configured for interlocking to connect the mount body and the valve assembly together.

9. The fuel system apparatus as in claim 1, further comprising a nozzle depending from the mount body, the permeation barrier disposed proximate an interior surface of the nozzle to block fuel vapor permeation from the nozzle.

10. A fuel system apparatus for a fuel tank including a valve assembly disposed in an interior of the fuel tank, the fuel system apparatus comprising:
    a mount body made of a weldable material and an anti-permeation material, the mount body connected to a valve and welded to a tank wall at a weldpoint, the anti-permeation material embedded in the weldable material such that the anti-permeation material is spaced apart from the weldpoint.

11. The fuel system apparatus as in claim 10, wherein the weldable material and the anti-permeation material are co-extruded.

12. The fuel system apparatus as in claim 11, wherein the anti-permeation material is disposed between at least two layers of the weldable material.

13. The fuel system apparatus as in claim 11, wherein the weldable material is HDPE and the anti-permeation material is EVOH.

14. The fuel system apparatus as in claim 10, wherein the mount body includes a nozzle having an inner surface defining a passageway therethrough, the anti-permeation material disposed proximate the inner surface.

15. A fuel system apparatus for a fuel tank, the fuel system apparatus comprising:

a mount body defining a passageway in communication with an interior of the fuel tank, the mount body formed from multiple layers of material including at least one layer of an anti-permeation material configured to block fuel vapor permeation, the mount body further including a weld foot configured for welding to a surface of the fuel tank at a weldpoint, the anti-permeation layer being co-extruded at least within the weld foot and disposed within the weld foot such that the anti-permeation layer is spaced apart from the weldpoint; and a valve assembly attached to the mounting portion and at least partially disposed in the inside of the fuel tank and configured to selectively open or close communication between the passageway to the inside of the fuel tank.

16. The fuel system apparatus of claim 15, wherein the material of the multiple layers is selected from the group consisting of a polymer, a metal, an adhesive, and combinations thereof including combinations with the anti-permeation material.

17. The fuel system apparatus of claim 15, wherein the weldable material surrounds the anti-permeation layer.

18. The fuel system apparatus of claim 15, wherein the anti-permeation material is EVOH.

19. The fuel system apparatus of claim 15, wherein the mount body is unitarily formed with the weld foot.

20. The fuel system apparatus of claim 15, wherein the anti-permeation material is disposed only in the weld foot.

* * * * *